US006689298B2

(12) United States Patent
Yoshida

(10) Patent No.: US 6,689,298 B2
(45) Date of Patent: Feb. 10, 2004

(54) BAMBOO FIBER BOARD METHOD

(75) Inventor: Seiji Yoshida, Osaka (JP)

(73) Assignee: Japan Blower Ind. Co., Ltd., Osaka (JP)

( * ) Notice: Subject to any disclaimer, the term of this patent is extended or adjusted under 35 U.S.C. 154(b) by 0 days.

(21) Appl. No.: 10/411,288

(22) Filed: Apr. 11, 2003

(65) Prior Publication Data

US 2003/0207140 A1 Nov. 6, 2003

Related U.S. Application Data

(62) Division of application No. 09/765,611, filed on Jan. 22, 2001.

(51) Int. Cl.[7] .......................... B29B 11/02; B29B 11/14; B29B 13/10

(52) U.S. Cl. ....................... 264/115; 264/118; 264/122; 264/123; 264/126

(58) Field of Search .................................. 264/109–128

(56) References Cited

U.S. PATENT DOCUMENTS 3,753,826 A * 8/1973 Plummer .................... 156/277
3,829,902 A * 8/1974 Fisher ........................... 2/338
5,314,582 A * 5/1994 Nguyen et al. ............. 162/100
5,786,063 A * 7/1998 Shibusawa et al. ......... 144/333
5,972,467 A * 10/1999 Washo ........................ 428/107
6,224,698 B1 * 5/2001 Endo .......................... 156/196
6,568,142 B2 * 5/2003 Yoshida ..................... 52/582.1

FOREIGN PATENT DOCUMENTS

EP 765738 A1 * 4/1997

* cited by examiner

*Primary Examiner*—Stephen J. Lechert, Jr.
(74) *Attorney, Agent, or Firm*—Bacon & Thomas

(57) ABSTRACT

Two types of synthetic resin are used with fibers (2) made from a wide range of bamboo canes from undried to dried. An appropriate amount of special thread (4) comprising a core thread (5) having a high melting point and a core-thread covering skin (6) having a low melting point are added to the fibers and kneaded together. When molding the kneaded material, it is heated to the temperature at which the skin starts to melt and pressed. Then the skin works as a binder that binds the fibers and the core thread. The core thread supplements the strength and the flexibility of the bamboo fiber board.

19 Claims, 2 Drawing Sheets

BAMBOO FIBER BOARD METHOD

This application is a divisional application of co-pending U.S. application Ser. No. 09/765,611, filed Jan. 22, 2001 (of which the entire disclosure of the pending, prior application is hereby incorporated by reference).

FIELD OF THE INVENTION

The present invention relates to a bamboo zephyr board made by kneading continuous mesh fiber bamboo zephyrs into a board having an infinite number of gaps inside.

BACKGROUND OF THE INVENTION

Wood has a long history during which abundant techniques for processing wood have been developed. Some of these techniques have led to the development of new materials. These materials are divided into those taking advantage of the wood's original shape and those that have no relation with the wood's shape. The former type includes square timbers, boards and laminated boards, while the latter type includes compressed boards called particle boards or M.D.F boards, which are made by compressing chips by grinding, cutting and bonding, and cemented excelsior boards.

Wood has been used in various forms of building materials. But the wood's poor reproducibility has always been a cause for its short supply and increased cost. In search of low cost building materials, bamboo, which previously had limited uses despite their good reproducibility, have begun to be used as alternative building materials thanks also to advances in production technology, which made it possible to process round bamboo canes into flat plates.

Although bamboo is superior to wood in terms of reproducibility, most bamboo materials have a hollow cross sectional shape and a diameter and a length that are shorter than wood materials. Many bamboo materials are also curved, which is a negative factor when viewed as building materials. Large-diameter portions of long bamboo canes are usable as building materials because they can be developed flat. But the remaining portions of such canes and many other smaller bamboo canes are not adequate as building materials, and have limited applications.

Bamboo has excellent reproducibility because it normally takes only three to five years before it can be used a building material and has hardness and a beautiful grain of fibers. As mentioned above, however, a large portion of a bamboo cane is discarded without being used. Therefore, producing a building material comparable to wood products using bamboo stems, branches and leaves is a challenge that can lead to an effective use of resources.

SUMMARY OF THE INVENTION

The objective of the present invention is to make effective use of bamboo stems, branches and leaves, thereby to solve the above-mentioned problems by providing a bamboo zephyr board.

In one aspect, the present invention is a bamboo zephyr board using a zephyr taken from a range of undried to near undried bamboo canes of an appropriate length, characterized in that the zephyrs are kneaded and pressed while being heated at a temperature at which vascular bundle ingredients contained in bamboo ooze out to the surface and, using the extract of the bamboo as a binder that binds the zephyrs, formed into a board of a certain shape, equipped with an infinite number of gaps inside.

In another aspect, the present invention is also a bamboo zephyr board using a zephyr taken from a range of undried to dried bamboo canes of an appropriate length, characterized in that the zephyrs are kneaded after being added with an appropriate amount of synthetic resin fiber thread that melts at a desired heating temperature and, using the molten thread as a binder that binds the zephyrs, pressed and formed into a board of a certain shape equipped with an infinite number of gaps inside.

DETAILED DESCRIPTION OF THE PREFERRED EMBODIMENTS

The present invention uses zephyrs (i.e. continuous mesh fiber) taken from an appropriate length of a bamboo cane or a combination of such zephyrs and chips. The zephyrs are kneaded and crossed at random until they form a mass of an appropriate size. The zephyrs are then pressed and heated, and glued using the ingredients of the zephyrs themselves or with a synthetic resin fiber thread or with an adhesive. In this way, the zephyrs are made into a board of an appropriate size having an infinite number of gaps inside.

The zephyrs are made from a range of undried to dried bamboo canes stripped of joint ridges and joint disks. Continuous mesh fibers can be collected by rolling a long bamboo cane with a grooved roller, but this method requires the cutting process afterwards. By using short canes selected from the range of 10 to 100 mm, or more preferably, 10 to 70 mm, and processing them with a crusher, short fibers can be obtained directly. These zephyrs are agitated and mixed so that the fibers are crossed randomly. The zephyrs are then heated by way of indirect heating using steam and hot air or by way of direct heating using high-frequency wave and microwave and made into an appropriate shape.

When producing zephyrs from a range of undried to near undried bamboo canes, vascular bundle ingredients such as hemi-cellulose and lignin ooze out to the surface because of the heat. These ingredients work as a binder. Therefore, the zephyrs can be made into a board without using any adhesive. By varying the amount of and pressure applied to the zephyrs, a variety of boards ranging from those having the hardness and density of particle boards or M.D.F boards, which are made by compressing wood chips, to those having the hardness and density of glass wool, which is a non-compressed thermal insulating material.

When producing zephyrs from a range of dried to near dried bamboo canes, the ingredients are not expected to ooze out much even when heated. Therefore, when kneading zephyrs, a synthetic resin fiber thread that melts at an appropriate heating temperature is selected and added in a volume ratio of 5–50%, preferably 5–20%. Then the thread melted by heat works as a binder, which binds the zephyrs when they are pressed into a board shape. A polyethylene thread, for example, melts at a relatively low temperature.

While a thread made of a single material may melt and work as a binder, a special thread made of at least two kinds of synthetic resin, for example, a material with a high melting point for the core and a material with a low melting point for the skin that covers the core, can produce an effect that cannot be obtained by a thread made of a single material. In this case, the thread made of two kinds of synthetic resin in heated at the temperature at which the skin starts to melt. Then the skin words as a binder that binds the zephyrs with the core of the thread, which supplements the strength and flexibility of the board. For example, in the case of a special thread having the core made of polypropylene and the skin made of polyethylene, polyethylene melts first.

To form the zephyrs into a certain form after kneading, a split die is used. An appropriate pattern is formed so as to project on the surface of the split die. When the zephyrs are put in this die and heated and pressed, a zephyr board is formed with the pattern on its surface. In this way, a zephyr board having a multitude of dimples or through holes, for example, can be made easily. The only thing that needs to be taken into consideration when making such a pattern is that it is easy to take it off after the board is molded. Therefore, a variety of patterns can be formed. When zephyrs are taken from bamboo canes, the boards become white. If desired, they may be colored by pigment coating.

Wood chips or a combination of wood chips and chips of bamboo branches and leaves having a volume that is 10 to 50%, preferably 10 to 30%, of the volume of the zephyrs can be mixed to make a wood and bamboo board. Using a synthetic fiber thread in the abovementioned volume ratio as a binder and heat them till the fiber is melt, or by adding a powder or liquid adhesive in the volume ratio of 1 to 20%, preferably 10 to 15%, and heating them till the powder is melt or the liquid is solidified, a decorative plate having dispersed leaves and branches is obtained. The leaves change their color depending on the heating temperature. It is also possible to impart smell adsorptive capability to the board by adding bamboo powder to the chips of bamboo branches and leaves.

As a powder adhesive, styrene, ester, or polyamide family may be used. As a liquid adhesive, urethane family may be used. Apart from the binder, it is preferable to add a powder having water-holding power in the volume ratio of 0.5 to 10% to obtain a final product having water-holding power. As a water-holding powder, anionic substances may be used.

To enhance the water-holding power, it is preferable to apply diatomaceous earth to the surface of the zephyr boards. To enhance the appearance, it is preferable to apply a powder made from crushed shells to the surface of the zephyr boards.

As explained above, a zephyr board made entirely or mostly of bamboo has applications for its elasticity, thermal insulation, sound insulation and shock absorbing capability. After they finish their lives, they can be crushed and recycled, causing less strain on the environment. The characteristics of these zephyr boards are not found in other kinds of building materials.

BRIEF DESCRIPTION OF THE DRAWINGS

Other features and advantages of the invention will appear as the description proceeds when considered in conjunction with the accompanying drawings, in which:

FIG. 1(A) is a side view of the zephyr board of Example 1, while

FIG. 1(B) is an enlarged view of a portion of its model.

EXAMPLE 1

Figure 1:
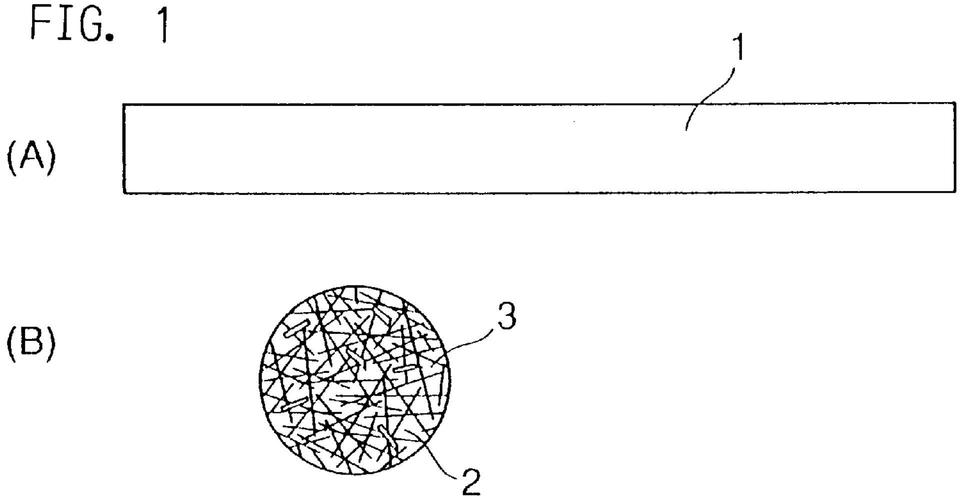

FIG. 1(A) is a view of the side of a zephyr board. FIG. 1(B) is an enlarged view of a portion of a plan view of the same zephyr board. To make the zephyrs 2 of FIG. (B), a long bamboo cane was roll-pressed by a roller to zephyrize the cane and cut into zephyrs of an appropriate length. Alternatively, a bamboo cane may be cut into rings first, and then further split into narrow pieces and crushed in a crusher to make mesh fibers. In the former method, it is easy to produce zephyr fibers of a uniform diameter and length, but in the latter method, it is difficult to standardize the diameter and length. It should also be considered, however, that excessively long fibers are difficult to be kneaded, and that crushers are usually cheaper than rollers.

Zephyr board 1 uses zephyrs 2 obtained from a range of undried to near undried bamboo canes. When the zephyrs were heated and molded in a die, the heat caused the ingredients of the zephyrs to be extracted. These ingredients worked as a binder that binds the zephyrs, therefore no other adhesives were necessary. By adjusting the amount of zephyrs 2 and the pressure that was applied to them, different specifications of zephyr board having different degrees of hardness and density but having the same size was obtained. Because the fibers cross with each other and create an infinite number of gaps 3, zephyr board 1 has elasticity, thermal insulation, sound insulation and a shock-absorbing capability. It is also possible to vary the levels of such capabilities according to the applications.

EXAMPLE 2

By adding a polyethylene thread having a volume corresponding to 15% of the volume of the zephyrs and kneading it with the zephyrs, the polyethylene melted and worked as a binder that binds the zephyrs. In this way, a zephyr board was made by pressure, and without adding any adhesive. While polyethylene is easy to use because it melts at a low temperature, it is easily deformed when heated. Therefore, this method is not expected to add strength or flexibility to the board. The capabilities obtained from this example were the same as those in Example 1 (see FIG. 1).

EXAMPLE 3

Figure 2:
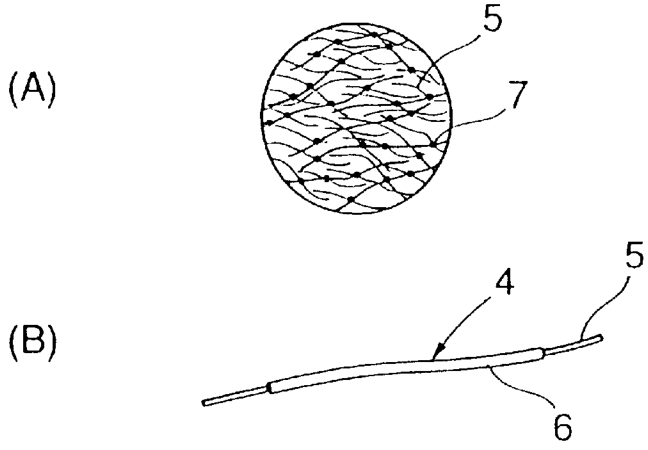
FIG. 2(A) shows a condition in which the special thread made of synthetic resin of Example 3 and zephyrs are adhered.
FIG. 2(B) is an enlarged model of a portion of the special thread.

FIG. 2(A) is an enlarged cross sectional model of a portion of a zephyr board made by mixing zephyrs 2 and a special thread 4 comprising a polypropylene core thread 5 and a polyethylene skin 6 in a volume ratio of 100 to 15. When producing this board in a die, etc., it was heated at a temperature at which only the skin melts. Then the molten skin formed a node 7 that worked as a binder between the zephyr and the core thread. The core thread supplements the strength and flexibility of the board.

In this configuration, zephyrs 2 produced from a range of undried to dried bamboo canes were used. No adhesive was necessary as in the case of a particle board, which was made by gluing chips with adhesive. By adjusting the amount of zephyrs and pressure, various zephyr boards having the same size but varying degrees of hardness and density were made. Fibers crossing inside the board form an infinite number of gaps, which provide the same capabilities as in Examples 1 and 2.

EXAMPLE 4

Figure 3:
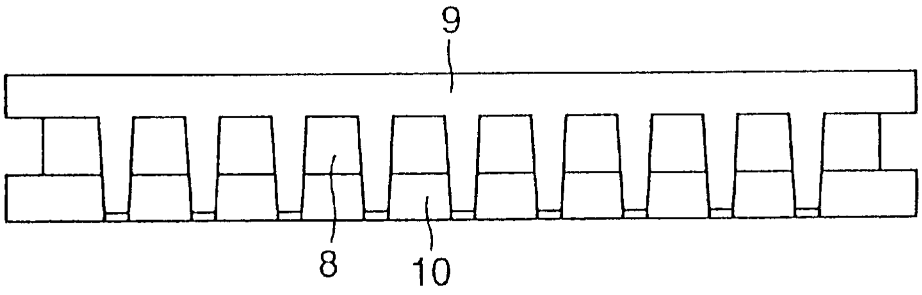
FIG. 3 shows a process of making the bamboo zephyr board having through holes of Example 4.

FIG. 3 shows a cross section of a bamboo zephyr board 8 having through holes. This board was made by using split dies 9, 10 that were used in the manufacturing process of the zephyr boards of Examples 1 and 2. Projections extend from one die to the other. The dies were heated and pressed to make the bamboo zephyr board 8 having through holes. Instead of the holes, the board may be given dimples. To make such a board, dies having short projects are used. As long as the dies are easily taken off the board, the projections may of any shape. By adjusting the amount of zephyrs 2 and pressure applied, various zephyr boards having the same size but varying degrees of hardness and density were made as in the other examples.

EXAMPLE 5

Chips of bamboo leaves and branches were added to the zephyrs 2 in a volume ratio of 10%. As a binder, powder adhesive was used. They were kneaded, heated and pressed to make a zephyr board 1 similar to the one shown in FIG. 1, or a zephyr board 8 having through holes similar to the one shown in FIG. 3. The surface of the board has a pattern of the dotted leaves and branches.

EXAMPLE 6

Figure 4:
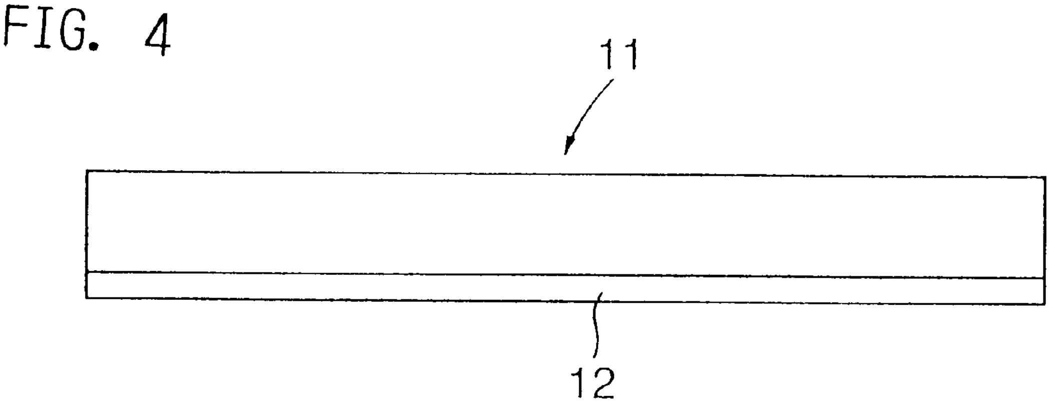
FIG. 4 shows a bamboo zephyr board having a diatomaceous earth surface.

FIG. 4 shows a bamboo zephyr board 11 having a diatomaceous earth surface 12. The board itself has no limitation of its ingredients and adhesives.

In the drawings and specification, there has been set forth preferred examples of the invention, and although specific terms are employed, they are used in a generic and descriptive sense only and not for the purpose of limitation, the scope of the invention being set forth in the following claims.

What is claimed is:

1. A method of making bamboo fiber board comprising the steps of:

obtaining bamboo fibers from undried to near undried bamboo canes, kneading, pressing and heating said bamboo fibers at a temperature at which vascular bundle ingredients contained in the bamboo fibers ooze out to the surface as an extract, using said extract of the bamboo as a binder to bind the bamboo fibers, and forming said bamboo fibers into a board of a certain shape containing a plurality of gaps inside.

2. A method of making bamboo fiber board according to claim 1, wherein a water-holding powder is added.

3. A method of making bamboo fiber board according to claim 1, wherein when the fibers are formed into a board of a certain shape, a multitude of dimples or through holes are formed simultaneously on the up side and down side of the fiber board.

4. A method of making bamboo fiber board according to claim 1, wherein diatomaceous earth is applied to the surface of the board.

5. A method of making bamboo fiber board according to claim 1, wherein shell powder is applied to the surface thereof.

6. A method of making bamboo board according to claim 1, wherein the bamboo fibers are undried.

7. A method of making bamboo board according to claim 1, wherein the bamboo canes are stripped of joint ridges and joint disks and have a range of 10–100 mm.

8. A method of making bamboo fiber board comprising the steps of:

obtaining bamboo fibers from undried to dried bamboo canes, kneading, pressing and heating a material consisting essentially of said bamboo fibers and synthetic resin fibers until the resin fibers become molten, using said molten resin fibers as a binder to bind the bamboo fibers, and pressing and forming said bamboo fibers and molten resin fibers into a board of a certain shape with a plurality of gaps inside.

9. A method of making bamboo fiber board according to claim 8, wherein the synthetic resin fibers comprises a core thread made of synthetic resin of a certain melting point and an external skin, which covers the periphery of the core thread, made of synthetic resin of a melting point lower than that of the core thread, and heating the synthetic resin fiber thread to a temperature at which the skin melts, the molten skin works as a binder that glues the bamboo fibers and the core thread work as a supplemental material that provides strength and flexibility to the bamboo fiber board.

10. A method of making bamboo board according to claim 9, wherein the bamboo fibers are undried.

11. A method of making bamboo board according to claim 9, wherein the bamboo canes are stripped of joint ridges and joint disks and have a range of 10–100 mm.

12. A method of making bamboo board according to claim 8, wherein the bamboo fibers are undried.

13. A method of making bamboo board according to claim 8, wherein the bamboo canes are stripped of joint ridges and joint disks and have a range of 10–100 mm.

14. A method of making bamboo board according to claim 8, wherein the synthetic resin fiber is present in an amount of from 5% to 50% by volume.

15. A method of making bamboo board according to claim 14, wherein the synthetic resin fiber thread is present in an amount of from 5% to 20% by volume.

16. A method of making bamboo board according to claim 8, wherein the synthetic resin fiber is present in an amount of from 5% to 50% by volume.

17. A method of making bamboo fiberboard comprising the steps of:

obtaining bamboo fibers and chips from undried to near undried bamboo, kneading, pressing and heating a material consisting essentially of said bamboo fibers and bamboo chips together with an adhesive, and forming said bamboo fibers, chips and adhesive into a board of a certain shape equipped with a plurality of gaps inside.

18. A method of making bamboo fiber board according to claim 17, wherein the chips are taken from crushed bamboo leaves and branches.

19. A method of making bamboo board according to claim 18, wherein the chips are present in an amount of from 10% to 50% by volume.

* * * * *